July 18, 1950  R. W. SILER  2,515,571
SLING CLAMP
Filed Nov. 15, 1948  2 Sheets-Sheet 2
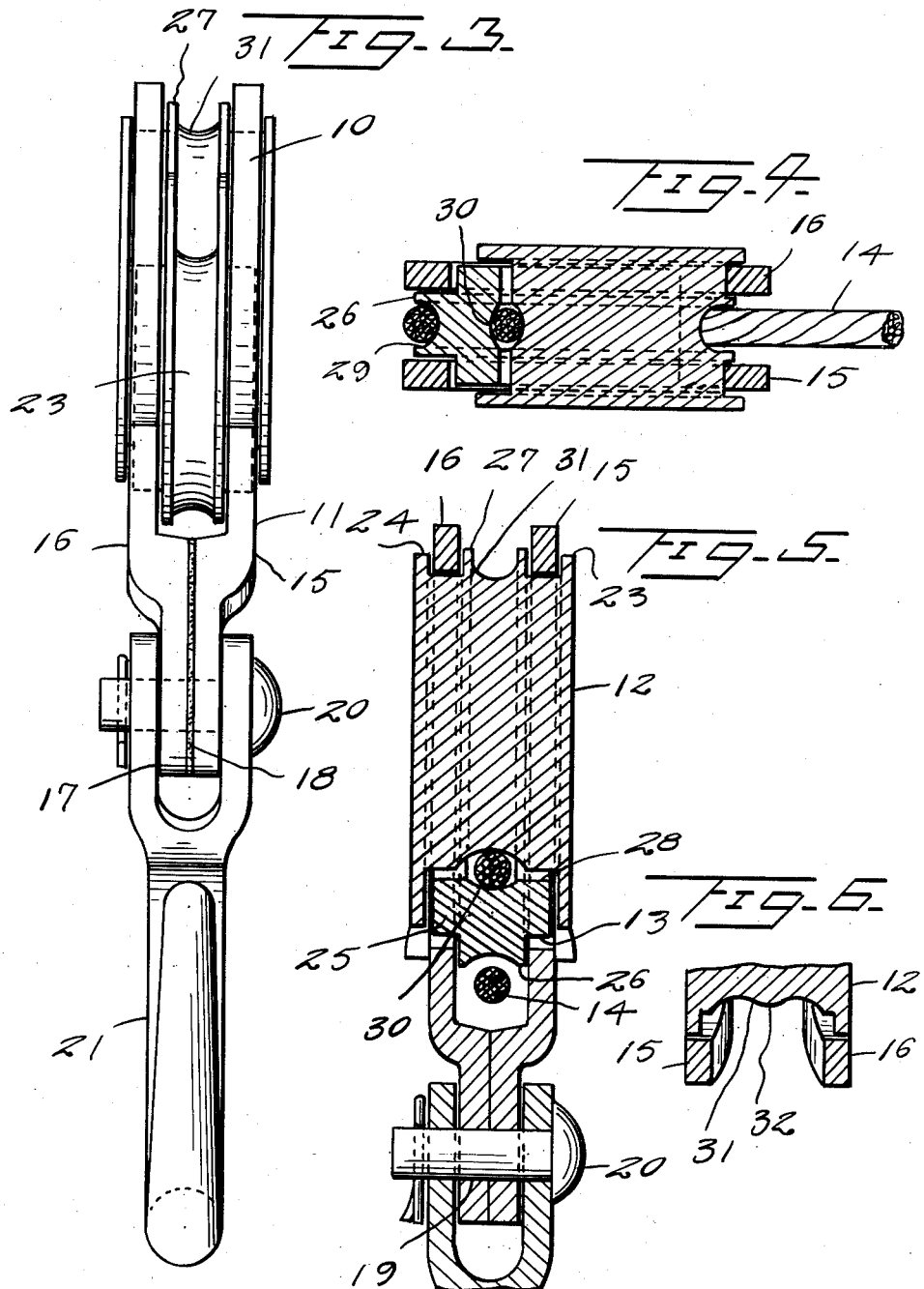
INVENTOR.
R. W. Siler
BY
Kimmel & Crowell Attys.

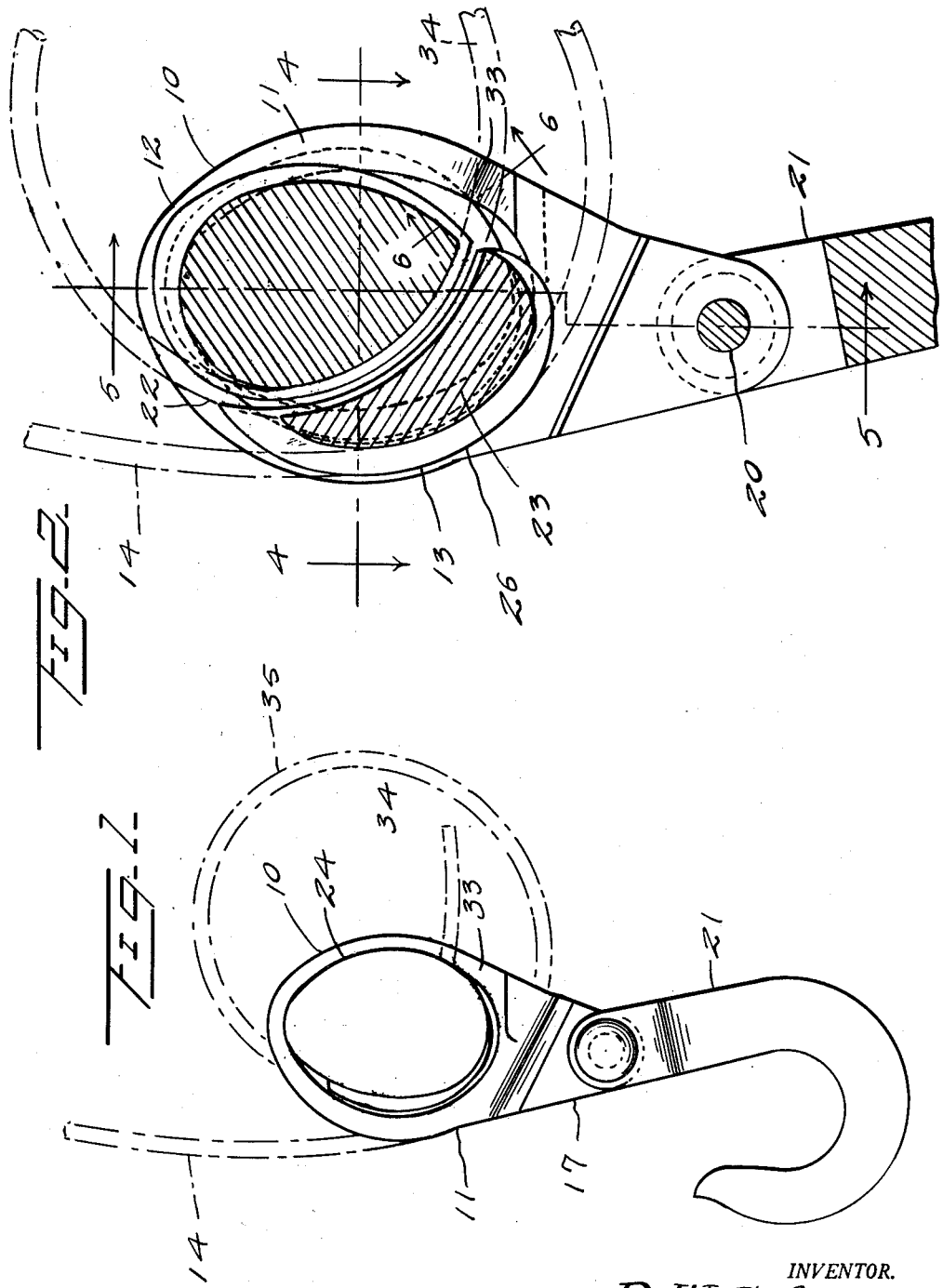

Patented July 18, 1950

2,515,571

UNITED STATES PATENT OFFICE 2,515,571

SLING CLAMP

Robert W. Siler, Endicott, N. Y., assignor to Siler Sling Corp., Hazard, Ky.

Application November 15, 1948, Serial No. 60,120

11 Claims. (Cl. 24—126)

This invention relates to a sling clamp or fitting and is an improvement over the structure embodied in my prior Patent No. 2,384,497, issued September 11, 1945. A modified construction is shown in copending application Ser. No. 82,534, filed March 21, 1949, for rope clamp.

An object of this invention is to provide a fitting embodying self-clamping feature for automatically clamping to a rope between the ends or at one end thereof, the fitting being adapted to be secured to a hook, shackle, turnbuckle or the like.

Another object of this invention is to provide an improved rope clamping fitting embodying a pair of eye frames formed with a ovoidal opening for accommodating line locking wedges.

A further object of this invention is to provide an improved rope clamping fitting embodying a pair of spaced apart eye frames formed with an ovoidal opening for receiving rope locking wedges formed with marginal fins for preventing the spreading apart of the frames.

A further object of this invention is to provide an improved rope clamping fitting including a forked eye frame formed with a pair of members joined at only one end thereof and having ovoidal openings therein for receiving rope locking wedges formed so that they are not able to be removed from the eye once assembled and also act to prevent spreading apart of the pair of members.

Still another object of this invention is to provide an improved rope clamping fitting embodying an eye frame formed with an ovoidal opening for receiving rope locking wedges, the wedges being so shaped as to subject the rope only to gradual bends approaching the ideal circular loop.

With the above and other objects in view, my invention consists in the arrangement, combination and details of construction disclosed in the drawings and specifications, and then more particularly pointed out in the appended claims.

In the drawings,

Figure 1 is a side elevation of a fitting constructed according to an embodiment of this invention, Figure 2 is an enlarged side elevation partly broken away and in section, showing the details of the line locking wedges and the manner of securing a flexible line to the fitting, Figure 3 is a detail front elevation of the fitting with a hook secured to the lower end thereof, Figure 4 is a transverse sectional view of the fitting taken on the line 4—4 of Figure 2, Figure 5 is a fragmentary sectional view taken on the line 5—5 of Figure 2; and Figure 6 is a fragmentary sectional view taken on the line 6—6 of Figure 2, showing a portion of the groove formed in one of the line locking wedges.

Referring to the drawings, the fitting designated generally by the reference numeral 10, consists of a body and a pair of line locking wedges 12 and 13, received by the body 11, for securing a line 14 to the fitting. The line 14 may be a fiber or wire rope, single wire strand, or any other type of line commonly in use.

The body 11 is constructed of a pair of members 15 and 16 having the upper portions thereof spaced apart, as seen in Figure 3, and joggled inwardly adjacent the bottom thereof to form a lug 17. The members 15 and 16 are shown joined together at the lower portions by means of welding 18. However, any other well known securing means could be used for this purpose such as bolts or rivets. The lug 17 has a bore 19 extending therethrough for receiving a pin 20 which secures a hook 21, shackle, turnbuckle, or the like to the fitting 10.

As seen in Figure 2, each of the members 15 and 16 is formed with an ovoidal opening 22 for loosely receiving the line locking wedges 12 and 13. The upper or larger wedge 12 is of approximately teardrop shape and is formed with the side faces extended to provide marginal fins 23 and 24. The smaller or lower wedge 13 is of generally crescent shape and when installed is positioned below and for the most part along the forward edge of the larger wedge 12, the wedges 12 and 13 together presenting a generally ovoidal outline. A portion of the marginal fins 23 and 24 overlies the outer faces of the members 15 and 16 along the top and rear portions thereof for restricting the spreading apart of these members. The remainder of the marginal fins 23 and 24 overlie the sides 25 of the smaller wedge 13 for aligning the wedges 12 and 13. The outer edge of the smaller wedge 13 is formed with a ridge 26 which extends beyond the outer of the ovoidal openings 22 for preventing the displacement of lower wedge from the body 11 once the wedges 12 and 13 are installed therein. The overlying portions of the marginal edges 23 and 24 are also effective in achieving this result. The central portion of the outer edge of the larger wedge 12 is also formed with an outwardly extending ridge of varying height tapering at the bottom of the wedge and indicated by the reference numeral 27 for loose engagement between the members 15 and 16. The ridge 26 and the inner concave face 28 of the smaller wedge 13 are each formed with line guiding grooves 29 and 30 respectively. Similarly, the wedge 12 is formed with a line guiding groove 31 along the center of the outer edge thereof. Both the groove 31 and the groove 30 have a flared portion towards the rear of that portion of each that is in confronting relation, as seen in Figure 6, for the purpose of permitting easy and non-binding operation as will be seen hereinafter in the description of operation. The groove 31 on the wedge 12 at this point spreads into two juxtapositioned grooves separated by a small central rise 32. The members 15 and 16 are bulged outwardly as at 33 along the back edge thereof adjacent the exit of the tunnel or passage formed by the confronting edges of the wedges 12 and 13 for the purpose of accommodating the double thickness of line at this point.

By way of describing the assembling of the line clamping fitting; the wedges 12 and 13 are first placed in their proper position within the opening 22 in either the member 15 or 16, the other member is then placed over the wedges and welded to the first member along the marginal edges of the lower portion, and finally the lug 17 is drilled or bored. In operation, the free end 34 of the line 14 is inserted from the front between the spaced apart portions of the members 15 and 16 and below the outer edge of the wedge 13. The free end 34 is then threaded through the back of the body 11 and looped upwardly and forwardly as seen in Figure 1 and inserted downwardly between the confronting edges of the wedges 12 and 13. The free end 34 is then threaded rearwardly between the wedges 12 and 13 so that a portion of the line projects out of the back of the body 11. When load is applied to the pin 20 the line 14 is placed under tension causing it to bear against the groove 29 thus forcing the wedge 13 against the wedge 12 and clamping the free end 34 of the line in the grooves 30 and 31 between the wedges 12 and 13. The rise 32 and the flared portions of the grooves 30 and 31 will position the free end 34 off to one side, so that the loop 35 when drawn tight by the tension in the line 14 will be enabled to assume a natural straight line in passing from the groove 29 on the wedge 13 to the rear portion of the groove 31 on the wedge 12. The ovoidal shape of the opening 22 and the wedges 12 and 13 when assembled prevents the rotation of the wedges in the opening when a load is applied. The marginal fins 23 and 24 and the ridges 26 and 27 prevent the wedges from falling out of the body 11 when no line is positioned therebetween or when no load is applied. Further the bulged out portion 33 of the members 15 and 16 permit the pushing to one side of the free end 34 by the rise 32 so as to accomplish the elimination of any abrupt changes of direction in the loops 35. The ovoidal shape of the wedges and the foregoing features provide a line clamping fitting in which the line is not subjected to any sharp bends or twists.

The foregoing description and the drawings represent a preferred embodiment of my invention. However, I do not intend to limit myself to the specific details or embodiment disclosed but claim instead all constructions falling within the scope of the appended claims.

What I claim is:

1. A fitting as set forth comprising a body including a pair of members spaced apart for a substantial part thereof, each of said members being formed with an opening therein, and a pair of operatively associated line clamping wedges loosely engaging in said openings, one of said wedges being formed with marginal edge fins on the opposite faces thereof overlying the outer surfaces of said members and receiving a portion of the other of said wedges therebetween for restricting spreading apart of said members and lateral displacement of said other wedge relative to said first named wedge, respectively.

2. A fitting as set forth comprising a body including a pair of members spaced apart for a substantial length thereof and fixedly joined together at one end thereof, each of said members being formed with an ovoidal opening therein, a pair of operatively associated line clamping wedges loosely carried in said openings by said members, portions of one of said wedges overlying the outer surfaces of said members for limiting the spreading apart of the latter and overlying the opposite faces of the other of said wedges for preventing the lateral displacement thereof relative to the first named wedge, and means on the other of said wedges extending between said members for preventing the lateral displacement of said wedges relative to said body.

3. A fitting as set forth comprising a body including a pair of parallel spaced apart members formed with inwardly offset lug portions, said lug portions being fixedly secured together, said members each having an ovoidal opening therein, a pair of operatively associated line clamping wedges loosely engaging said openings, one of said wedges being formed with flanges extending along the marginal edges of the opposite faces thereof and overlying a portion of the outer surfaces of said members for limiting the spreading apart thereof, and overlying the opposite faces of the other of said wedges for preventing lateral displacement of said latter wedge relative to said first named wedge.

4. A fitting as set forth in claim 3 in which said last named wedge is formed with a portion thereof engaging between said members for preventing lateral displacement of said pair of wedges relative to said body.

5. A fitting as set forth comprising a body including a pair of members having parallel spaced apart portions formed with inwardly offset secured together lug portions, said members being formed with ovoidal openings in the spaced apart portions thereof, and a pair of line clamping wedges loosely engaging in said ovoidal openings, one of said wedges being substantially teardrop in shape, the other of said wedges being of substantial crescent conformation, said wedges when assembled having a combined conformation of the shape of said ovoidal openings, whereby said pair of wedges will be non-rotatable relative to said body.

6. A fitting as set forth in claim 5 in which said first wedge is formed with means thereon engaging said spaced apart portions for limiting the spreading apart thereof and engaging said other wedge for preventing lateral displacement of said other wedge relative to said first wedge.

7. A fitting as set forth in claim 6 in which said other wedge is formed with means thereon engaging between said spaced apart portions for preventing lateral displacement of said pair of wedges relative to said body.

8. A fitting as set forth comprising a body formed with an ovoidal opening extending therethrough, and a pair of line clamping wedges loosely engaging in said opening, one of said wedges being formed with a substantially ovoidal configuration, the other of said wedges being formed with a substantially crescent configuration, the concave portion of said other wedge being disposed in confronting relation to a portion of said first wedge whereby said wedges are adapted to clamp a line between said concave portion and said portion of said first wedge.

9. A fitting as set forth in claim 8 in which said wedges are formed with line receiving grooves extending about the edges thereof.

10. A fitting as set forth in claim 8 in which said first wedge is formed with a line receiving groove extending about the edge thereof, said other wedge is formed with a line receiving groove extending about the edge thereof, said line receiving groove in said concave portion of said other wedge and said line receiving groove in said portion of said first wedge being formed with flared portions.

11. A fitting as set forth in claim 10 in which said flared portion in said line receiving groove of said first wedge is formed with an outwardly extending centrally disposed ridge for positioning a portion of the line against one side of said latter flared portion.

ROBERT W. SILER.

REFERENCES CITED

The following references are of record in the file of this patent:

UNITED STATES PATENTS

| Number | Name | Date |
|---|---|---|
| 1,859,561 | Haworth | May 24, 1932 |

FOREIGN PATENTS

| Number | Country | Date |
|---|---|---|
| 694,725 | France | Sept. 22, 1930 |